United States Patent [19]

Dyer et al.

[11] Patent Number: 4,641,148

[45] Date of Patent: Feb. 3, 1987

[54] THERMAL PRINTHEAD WITH RIBBON EXIT GUIDE

[75] Inventors: Stanley Dyer; James J. Molloy; Thoi Nguyen; David M. Riherd; William F. Voit, Jr., all of Lexington; Donald L. West, Winchester, all of Ky.

[73] Assignee: International Business Machines Corporation, Armonk, N.Y.

[21] Appl. No.: 793,597

[22] Filed: Oct. 31, 1985

[51] Int. Cl.⁴ .............................................. G01D 15/10

[52] U.S. Cl. ................................ 346/76 PH; 346/105; 400/120; 400/248

[58] Field of Search .............. 346/76 PH, 105, 139 C; 219/216 PH, 543; 400/120, 229, 248

[56] References Cited

U.S. PATENT DOCUMENTS 4,329,075 5/1982 Applegate et al. ............ 346/76 PH 4,387,380 6/1983 Asakura et al. ................ 346/76 PH 4,408,908 10/1983 Applegate et al. ................ 400/120

OTHER PUBLICATIONS

*IBM Technical Disclosure Bulletin,* entitled "Thermal Printer Employing Heat Sink to Enhance Lift-Off Correction" by A. S. Campbell, vol. 26, No. 7A, Dec. 1983 at pp. 3301-3302 and entitled "Electrothermal Ribbon Path" by S. L. Applegate et al, vol. 23 No. 5, Oct. 1980 at p. 2012.

*Primary Examiner*—Arthur G. Evans

*Attorney, Agent, or Firm*—John A. Brady

[57] ABSTRACT

A wear-resistant ribbon guide surface (11 or 25*a*, 25*b*) is added to a thermal printhead (1) to lower the ribbon exit angle after printing or to shift the ribbon exit position away from the printing. The angle past that surface remains large enough for visibility of prior printing. The modification of exit conditions makes the printing darker and significantly improves printhead life.

16 Claims, 8 Drawing Figures

THERMAL PRINTHEAD WITH RIBBON EXIT GUIDE

DESCRIPTION

1. Technical Field

This invention relates to thermal printers having a ribbon or other transfer medium upon which a thermal printhead presses during printing, the ribbon being directed away from the print area immediately past the printing location. In such a printing system the angle or beginning location of separation of the ribbon from the print plane is often significant, and this invention provides means to set that angle or beginning location.

2. Background Art

This invention employs a guide member mounted on the printhead to control the exit angle of the transfer medium or to shift the location at which the exit begins. Guide members mounted on a unitary, moving structure with the printhead are disclosed in U.S. Pat. No. 4,387,380 to Asakura et al and *IBM Technical Disclosure Bulletin* article entitled "Electrothermal Ribbon Path," by Applegate et al, Vol. 23, No. 5, October 1980 at p. 2012. In both structures, the printhead and the guide member are separately supported by a carriage or carrier.

*IBM Technical Disclosure Bulletin* article entitled "Thermal Printer Employing Heat Sink To Enhance Lift-Off Correction," by A. S. Campbell, Vol. 26, No. 7A December 1983 at pp. 3301–3302 discloses a thermal printhead with a heat sink hinged to the printhead. Attachment between the thermal printhead and the heat sink is by a flexible member. The ribbon exit is shown guided by the heat sink. One position is for printing and one position is for lift-off correction. In the lift-off correction position, ribbon peeling is prevented until well after the printing position.

U.S. Pat. No. 4,408,908 to Applegate et al is generally illustrative of the printing system of which this invention is an enhancement. That patent shows nip rollers 44 and 46 mounted on a carrier 18 which also carries the printhead. The nip rollers 44 and 46 pull the ribbon across the printhead and thereby define a fixed exit angle of the ribbon as it leaves the printhead where the printhead presses paper against the platen.

With elements on the carrier fixing the exit angle, such as the rollers 44 and 46 in this patent, obtaining a smaller exit angle (i.e. and angle in which the ribbon is closer the platen) may be impractical. This is particularly so for a typewriter, since visibility of material just printed is an important characteristic. Where a small exit angle is set by a guide on the carrier, the ribbon would have a long expanse near the paper which would block visibility. Also, the guide members would have to be moved nearer to the printing plane than their position for the larger exit angle, and this would require redesign and relocation of associated elements. The success of such redesign is uncertain as the unsupported length of ribbon past the printhead would present technical difficulties.

DISCLOSURE OF THE INVENTION

In accordance with this invention, a wear-resistant surface is added to the printhead to lower the ribbon exit angle after printing or to shift the exit position away from the location of printing. The angle past that surface remains a large one as set by ribbon feed positioning elements past the printhead. The primary embodiment has a three-sided metal rod with two ends embedded in the printhead to hold the middle side across the face of the printhead, where it encounters the ribbon across the width of the ribbon. A second embodiment locates metal springs at the top and bottom of the printhead or locates one wide spring across the printhead. All of the embodiments improve printing of characters primarily by improving the printing at the outer regions of the column of print elements, where unsatisfactory printing otherwise tends to first occur, apparently because the ribbon peels from the platen earlier from those outer regions.

This modification of exit conditions affects the printing, generally making it darker, and is therefore particularly important for quality printing on rough papers. The reduced angle of ribbon movement across the printing elements of the printhead reduces forces by the ribbon on the printing elements and wear of those is correspondingly reduced. The reduction or shift of the exit angle is achieved without any requirement to modify other feed elements. As the added guide member may be very close to the location of printing, a large exit angle of the ribbon subsequent to the added guide member permits good visibility of previous printing.

The first embodiment has a guide member which may be rigid. Such a member must be positioned so that it does not come into contact with the platen or other writing surface, as it would then tend to lift the print elements away from desired pressure contact with the writing surface. The alternative embodiment does have the guide member pressing against the writing surface, but the guide member is a spring or other highly yieldable element which adjusts with only light force translated to affect the print elements. The spring, nevertheless, should provide sufficient force to hold the ribbon against the writing surface, resulting in the peel point being at locations past the location of the spring.

The added guide member preferably is metal and may be another low friction, abrasion-resistant material which will not be worn away by the ribbon during use. The second embodiment, which has springs as guides only at the top and bottom, is an alternative particularly useful to improve printing which occurs near the top and bottom of the printing area, typically areas which receive superscripts and subscripts, the descenders of y's and j's, and the edges of fractions written vertically.

BRIEF DESCRIPTION OF THE DRAWINGS

The details of this invention will be described in connection with the accompanying drawing, in which.

BEST MODE OR CARRYING OUT THE INVENTION

Figure 1:
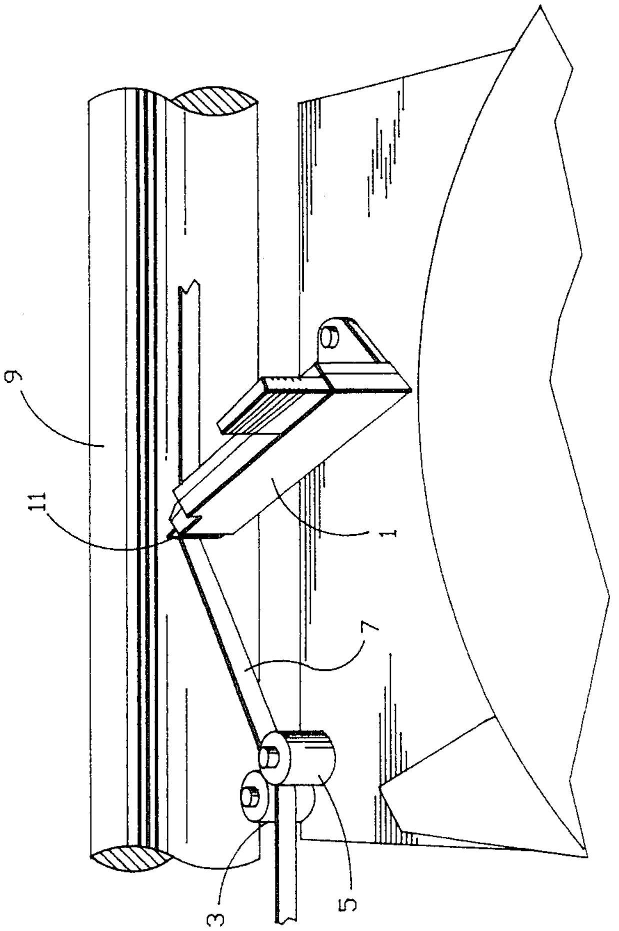
FIG. 1 is a fragmentary perspective view illustrating the exit angle of a thermal printer.
Figure 2:
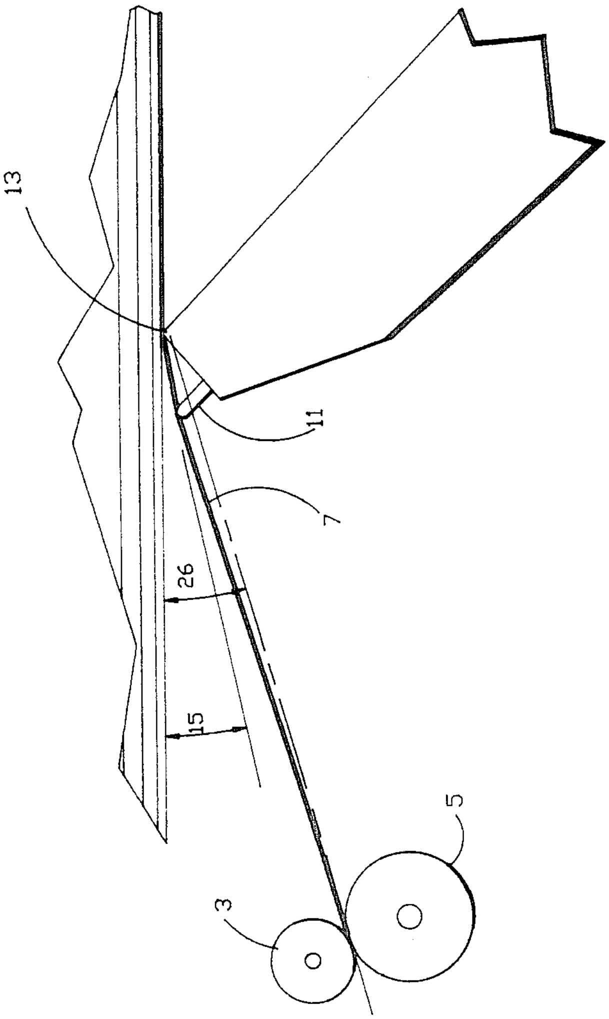
FIG. 2 is a top view illustrating how the exit angle is controlled in accordance with this invention.

FIG. 1 illustrates the preferred printhead 1 of this invention in a feed system of primary interest in that feed rollers 3 and 5 control the location of ribbon 7 by pulling it across printhead 1. Printhead 1 presses ribbon 7 toward platen 9, to effect printing against paper to be held against platen 9. Except for the metal guide 11, mounted in printhead 1 as will be described in detail below, the printing system is previously known and is generally as described, for example, in the U.S. Pat. No. 4,408,908, discussed above under the heading Background Art and incorporated by reference for the purposes of this description. Ribbon 7 is resistive and receives current from a column of 40 electrodes 13 (FIG. 3) in printhead 1 to generate heat within ribbon 7 which causes thermal ink to flow from ribbon 7 to paper or other surface being printed upon. Printing is by movement of printhead 1 from left to right. Ribbon 7 begins to separate from the plane of printing at platen 9 immediately after being printed upon. Guide 11 provides a separation angle of about 15 degrees from the plane of printing. That is shown in FIG. 2 by a solid line. Without guide 11 the ribbon would be directed immediately from the location of printing toward the nip of rollers 3 and 5, giving a larger exit angle, 26 degrees, shown by a dashed line in FIG. 1. As the separation between the electrodes 13 and the distant side of guide 11 is less than 3.6 millimeters (mm) that portion covers less than two typical printed characters. Past guide 11, the much larger angle of approximately 26 degrees is assumed by ribbon 7, which directs ribbon 7 away from platen 9 sufficiently to permit good visibility of, previous printing. (Printhead 1 is automatically rotated somewhat from platen 9 during inactive periods, which reduces visual obstruction from printhead 1).

This reduced angle of exit or separation increases the area of printing, the extent depending on the level of current applied by electrodes 13 and other variables. In one typical application the measurable area of a printed capital E was increased 3 percent and the measurable area of a slash (/) was increased 12 percent. The overall printing effect is significantly darker and satisfactory printing is achieved on papers which are so rough as not to be usable with the prior ribbon exit angle.

Figure 3:
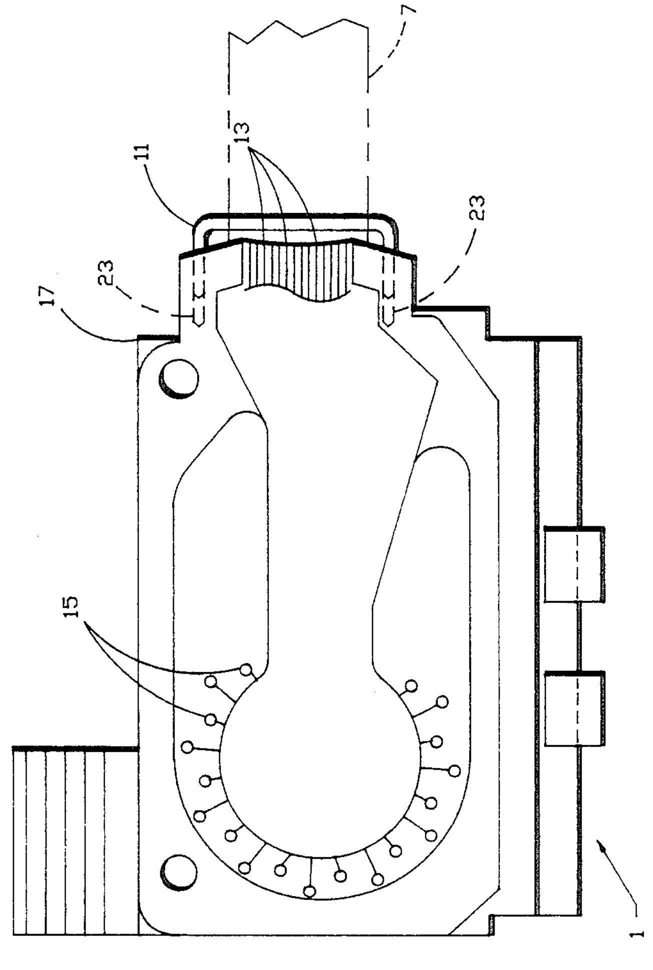
FIG. 3 is a side view of the preferred embodiment of the printhead with a projecting metal guide.

Metal guide 11 is 0.79 mm diameter stainless steel wire. Referring to FIG. 3, which is a side view of the preferred printhead 1. Printhead 1 is a separate element so that it may be replaced in a typewriter or printer as required. Electrodes 13 extend to a series of contact pads 15 in the center of printhead 1. When printhead 1 is mounted for use as suggested in FIG. 1, contact pads 15 are positioned to receive the electrical signals for printing. Such details of printhead operation are not new or significant to this invention and will not be discussed in further detail.

Figure 4:
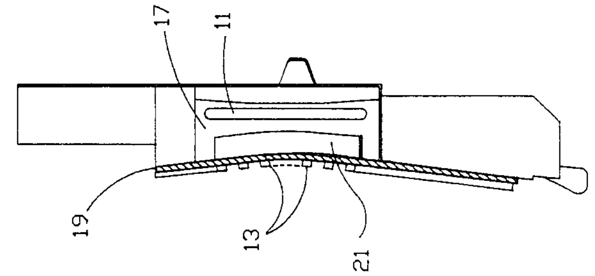
FIG. 4 is an enlarged, fragmentary end view of the apparatus shown in FIG. 3.

The supporting body 17 of printhead 1 is RYTON plastic (Trademark of Phillips Petroleum Co.), a 40 percent glass filled polyphenylene sulfide material which is a firm solid. As shown in FIG. 4, electrodes 13 are supported on a thin, heat resistant layer of polyimide 19 and the area comprising electrodes 13 is spaced from the body 17 by a body of elastomeric material 21, which permits electrodes 13 to conform to the area being printed upon.

Figure 5:
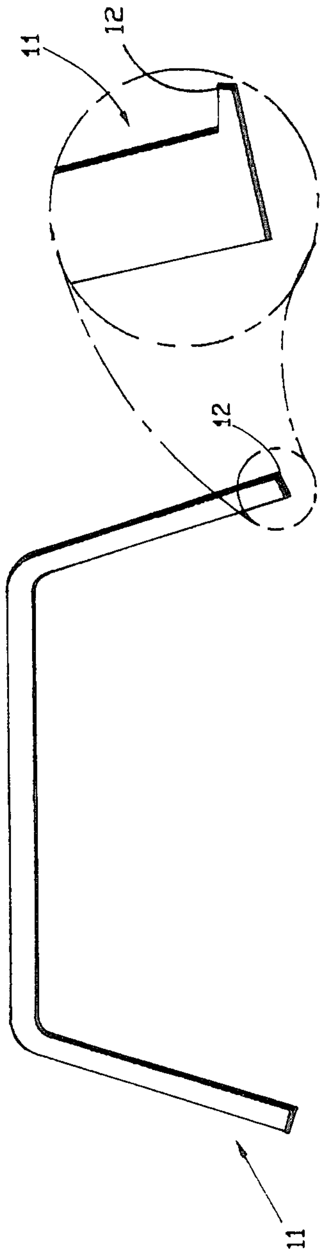
FIG. 5 is a plan view of the three sided metal guide alone.

Holes 23 (FIG. 3) are drilled on opposite sides of electrodes 13 perpendicular to the column formed by electrodes 13. Holes 21 are 0.79 mm in diameter, the same diameter as the wire of guide 11 and are drilled well past the intended depth of insertion of guide 11. Guide 11 before insertion is shown in FIG. 5. It is bent into three sides with each corner being 87 degrees, or 3 degrees less than a right angle. The middle length is slightly less than 11 mm; it provides rigid support the entire width of ribbon 7 during use. The two ends of guide 11, as shown in enlargement in the insert, have been severed by outward movement of a cutting tool, thereby providing a barb 12 at each tip. Each tip is about 0.82 mm in overall diameter.

As best seen in FIG. 3, barbed ends 12 or guide 11 are inserted in holes 23 to a depth such that the outer edge of guide 11 is nominally 1.3 mm past the lowest point on electrodes 13. Guide 11 is symmetrical with respect to electrodes 13 and is spaced from them a distance which is nominally about 3.5 mm (which varies slightly because electrodes 13 bow inward slightly, as shown in FIG. 3 so as to make a vertical column on the platen 9).

Metal guide 11 is grasped by its two terminal arms, these are bent inward until their ends conform with the separation of holes 23, and then guide 11 is moved as a body to insert the two terminal arms in holes 23. The close fit with holes 23 and the barbs 12 at each end of guide 11 are generally sufficient to resist separation, but adhesive may be added if appropriate. Preferably, this insertion operation is done by machine, not manually.

In the thermal printing systems employed with this invention, the defective printing involved is most acute and observable in characters that print very close to the top and bottom of the possible print locations, such as the tail of y's and k's and other characters having ascenders and descenders. This appears to occur because of a difference in the time from heating to peeling moving from the center to the edges of printing on the round platen 9. The ribbon 7 is held vertically at the printing point by the printhead 1 which is configured to apply electrodes 13 as a vertical column. After printing ribbon 7 is pulled away from the semi-cylindrical shape on platen 9 and becomes unsupported and therefore planar.

Figure 6:
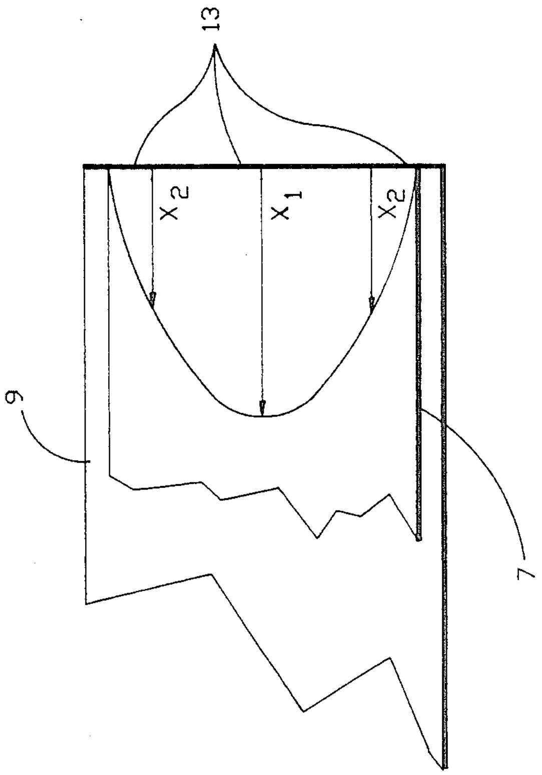
FIG. 6 illustrates differential peeling from the platen which is modified or shifted in accordance with the embodiments described to improve printing and printhead wear.

This results in a generally parabolic curve where ribbon 7 looses contact with platen 9 as it peels away. Such peeling with the parabolic shape greatly exaggerated is illustrated in FIG. 6. The center distance X1 from electrodes 13 being longer than the distance of peeling X2 at equally higher and lower positions. The forward location of peeling is at the upper and lower edges of ribbon 7. These locations, therefore, peel away from printing made from those location earlier than printing made from the middle of the ribbon. The printing geometry is essentially symmetrical, and the middle of characters are, therefore, printed from the middle of the ribbon 7, while higher and lower parts of characters are printed from the upper and lower regions across ribbon 7.

In the first embodiment, premature peeling, especially near the top and bottom of ribbon 7 is negated by reducing the exit angle, which has the effect of lengthening the contact of ribbon 7 to the printing area. This delays the peeling of the ribbon 7 to a more optimally cooled condition before peeling the melted and partially resolidified printed character out of the ribbon proper. The second, alternative embodiment is also a means of delaying the peeling of the ribbon 7 to a more optimally cooled condition. Extremely shallow exit angles have been observed to cause deficient printing near the center of the area of printing and are, therefore, not used.

Figure 7:
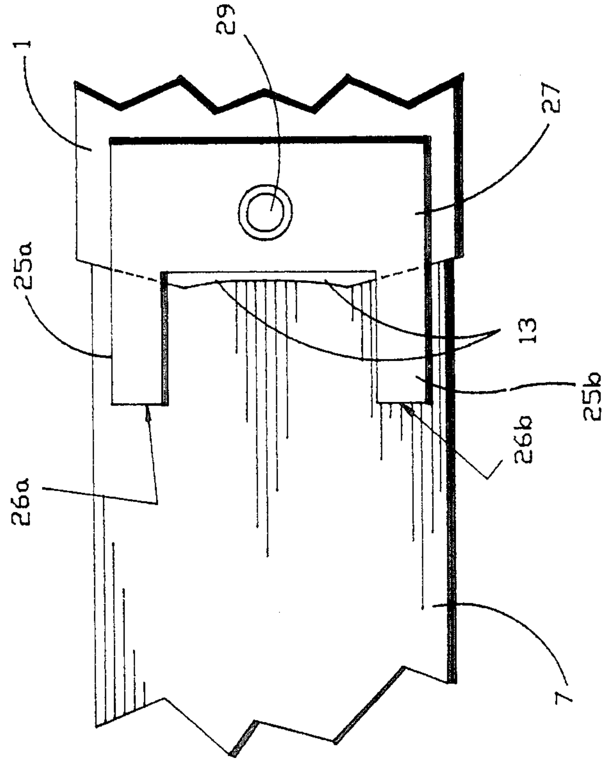
FIG. 7 is a top view of an alternative embodiment.

In both embodiments peeling at the upper and lower regions of the ribbon is believed to be beneficially modified, as the primary deficiencies cured by both embodiments are in areas of printing from the upper and lower regions of the ribbon. In a typical case mentioned above the area of a capital E was increased only 3 percent while the area of a slash, which extended both into the higher and lower regions of printing than the E, was increased 12 percent. This second embodiment delays the peeling of printing by attaching spring ribbon guides. The illustration shown in FIG. 7 shows two springs 25*a* and 25*b* near the top and bottom of the column of electrodes 13, which should be sufficient since they operate on the locations where ribbon 7 would otherwise first begin peeling. A spring extending across the entire printing region is an alternative which would be employed if necessary in a given application. Two spring guides 25*a* and 25*b* are shown in the FIG. 7, a top view (guides 25*a* and 25*b* would be joined into a single spring in the alternative just mentioned). Springs 25*a* and 25*b* have curved ends 26*a* and 26*b* to avoid any sharp surface contacting ribbon 7. Curved ends 26*a* and 26*b* extend toward electrodes 13 so that ribbon 7 is contacted by ends 26*a* and 26*b* close to electrodes 13. They may be extensions of a single, flat, support member 27 as shown, which is fixed to the surface of printhead 1 opposite electrodes 13 by a heat deformed (hot upset) tenon or stud 29 or other conventional fastener (members 25 and 27 could be a single wire bent into a loop to wrap around a stud 29).

Guides 25*a* and 25*b* extend outward past the end of printhead 1 so as to lightly cause ribbon 7 to contact platen 9 during printing at a location in the order of magnitude one-half to one character width forward of the position of electrodes 13 on platen 7. Springs 25*a* and 25*b* are parallel with each other and extend along printhead 1 where they contact it and then extend toward the platen 7.

Figure 8:
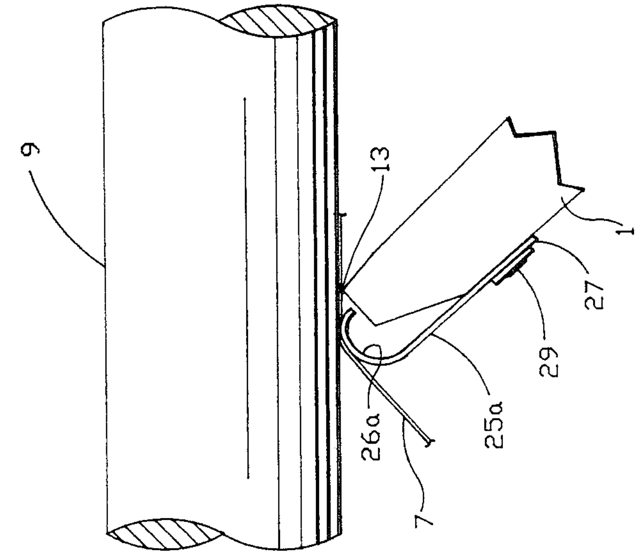
FIG. 8 is a side view of the alternative embodiment of FIG. 7 which illustrates it in operation with a ribbon and a platen.

FIG. 8 is a side view which illustrates this alternative embodiment in operation. Regions of ribbon 7 which would normally begin the peel immediately after printing are held against the platen by springs 25*a* and 25*b*. This necessarily also tends to shift the peeling of the central region of ribbon 7. After the ribbon clears springs 25*a* and 25*b*, the peeling is at the large angle set by the nip rolls 3 and 5 (FIG. 2) of the printer. The parabolic shape (FIG. 6) of the peeling is not understood to be significantly modified, but the initiation of peeling is delayed, which achieves the desired darker and improved printing.

Printing is improved. Improved printhead life should also be realized to the extent that failures attributable to poor printing near the top and bottom regions necessarily are reduced as printing in those regions improves. Secondly, the pressure distribution under the head from the semi-cylindrical shape on the platen 9 is nonuniform. Holding the ribbon 7 against the platen 9 should make the pressure uniform, thereby producing a uniform wear which will avoid failure by concentrating wear on certain electrodes 13.

The first embodiment, by modifying the peel angle for the entire ribbon has been found to improve printing across all regions of the ribbon, but particularly in those areas closest to the top and bottom where most defects had been noted. This embodiment also minimizes the potential problem of lifting the electrodes 13 out of pressure contact with platen 9 through ribbon 7, as there is not such lifting force from guide 11 spaced from platen 9. Significantly, satisfactory printhead life has been found to be doubled by the first embodiment.

It will be apparent that modification can be made within the spirit and contributions of the two embodiments shown. Accordingly, patent coverages should not be limited to the embodiments shown, but should be as provided by law, with particular reference to the accompanying claims.

We claim:

1. A thermal printhead having a set of print elements for printing from a ribbon when said elements are driven, a solid body supporting said print elements, and a wear-resistant ribbon guide member having at least one end integral with a surface for guiding said ribbon after said ribbon has been printed from by said print elements, said one end being embedded in and positioned by said solid body.

2. The printhead as in claim 1 in which said guide member is elongated metal.

3. The printhead as in claim 2 in which said guide member is a wire having a barbed end inserted in a hole in said solid body of size providing a close fit by which said wire is held at least substantially by said barbed end.

4. The printhead as in claim 1 which said guide member is a three sided element, the two ends of which are embedded in and positioned by said solid body and the central region of which is positioned to encounter said ribbon across the width of said ribbon and define the angle of movement of said ribbon away from the location of said printing.

5. The printhead as in claim 4 in which said guide member is elongated metal.

6. The printhead as in claim 5 in which said guide member is a wire having each end barbed and inserted in a hole in said solid body of size providing a close fit by which said wire is held at least substantially by said barbed ends.

7. The printhead as in claim 4 in which said three side element has straight sides joined at substantially 90 degree angles.

8. The printhead as in claim 7 in which said guide member is elongated metal.

9. The printhead as in claim 8 in which said guide member is a wire having each end barbed the sides of said wire being initially joined at angles in the order of magnitude of 87 degrees, each barbed end being inserted in a hole in said solid body of size providing a close fit by which said wire is held at least substantially by said barbed ends.

10. A thermal printhead having a set of print elements adapted to print from a ribbon when said elements are driven, a solid body supporting said print elements, and at least one unitary metal guide member supported by said solid body and extending to a location spaced from said print elements and forming a ribbon guide surface, said ribbon guide surface defining a ribbon path from said print elements to said guide surface.

11. The printhead as in claim 10 in which said guide member is rigid and said ribbon path permits ribbon peeling immediately past said print elements at an angle defined by said guide member.

12. The printhead as in claim 11 in which said guide member has a region positioned to encounter said ribbon across the width of said ribbon.

13. The printhead as in claim 10 in which said guide member is yieldable and said guide member is positioned to press against the region of printing to shift the location at which peeling begins away from the location of said print elements.

14. The printhead as in claim 13 in which said guide member comprises two springs, each positioned to extend from said solid body, one to the upper region of printing from said ribbon and one to the lower region of printing from said ribbon.

15. A thermal printhead having a set of print elements for printing from a ribbon when said elements are driven, a solid body supporting said print elements, and a resilient, wear-resistent ribbon guide member supported by said solid body and extending from said solid body to press against the region of printing to shift the location at which peeling begins away from the location of said print elements.

16. A thermal printhead as in claim 15 in which said guide member comprises two springs, each positioned to extend from said solid body, one to the upper region of printing from said ribbon and one to the lower region of printing from said ribbon.

* * * * *